United States Patent [19]

Chaczyk

[11] Patent Number: 4,988,113

[45] Date of Patent: Jan. 29, 1991

[54] SEALED PROTECTIVE BOOT FOR MOVABLE SHAFTS

[75] Inventor: Adam W. Chaczyk, Sterling Heights, Mich.

[73] Assignee: Babcock Industries, Inc., Fairfield, Conn.

[21] Appl. No.: 486,526

[22] Filed: Feb. 28, 1990

[51] Int. Cl.$^5$ .............................................. F16J 15/50
[52] U.S. Cl. ............................ 277/212 FB; 74/18.2; 403/51; 464/175
[58] Field of Search ............ 277/212 FB; 74/18, 18.1, 74/18.2; 285/226; 403/50, 51; 464/173, 175

[56] References Cited

U.S. PATENT DOCUMENTS

| | | | |
|---|---|---|---|
| 4,058,018 | 11/1977 | Lauper | 74/18.2 |
| 4,407,517 | 10/1983 | Neyer | 277/212 FB |
| 4,702,483 | 10/1987 | Ukai et al. | 403/51 X |

Primary Examiner—William A. Cuchlinski, Jr.
Assistant Examiner—J. Folker
Attorney, Agent, or Firm—Barnes, Kisselle, Raisch, Choate, Whittemore & Hulbert

[57] ABSTRACT

There is provided a protective boot which provides an essentially constant volume chamber around a reciprocating shaft to prevent the inspiration of atmospheric contaminants into the area around the shaft.

The boot defines a chamber, which comprises two sections, a longitudinally extendible and contractible first section and a radially extendible and contractible second section. The second section is constructed of elements or portions which flex outwardly or pop out from a neutral position in response to an increase in pressure in the section, and other portions which flex inwardly from a neutral position in response to a decrease in pressure. The portions flex outward at a predetermined pressure which is higher than the neutral or atmospheric pressure. When a pressure decrease from neutral occurs, a relatively low pressure is reached, which is sufficient to initiate the inward flexing from a neutral position of other portions of the section.

Therefore, the contour of the boot changes at predetermined pressures to provide an essentially constant volume chamber around a reciprocating shaft to prevent the inspiration of atmospheric contaminants into the area around the shaft.

18 Claims, 3 Drawing Sheets

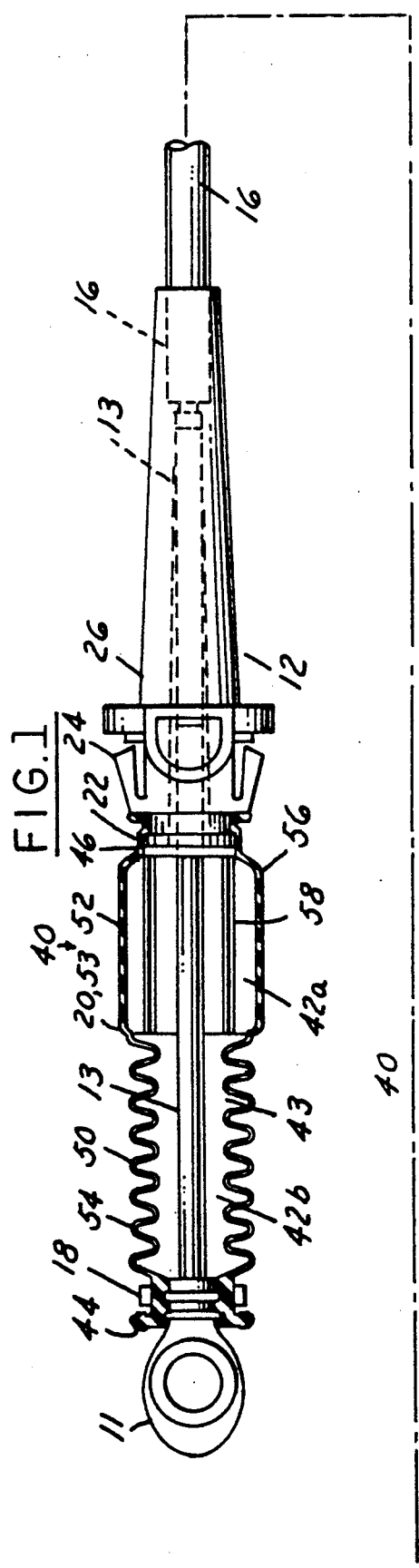
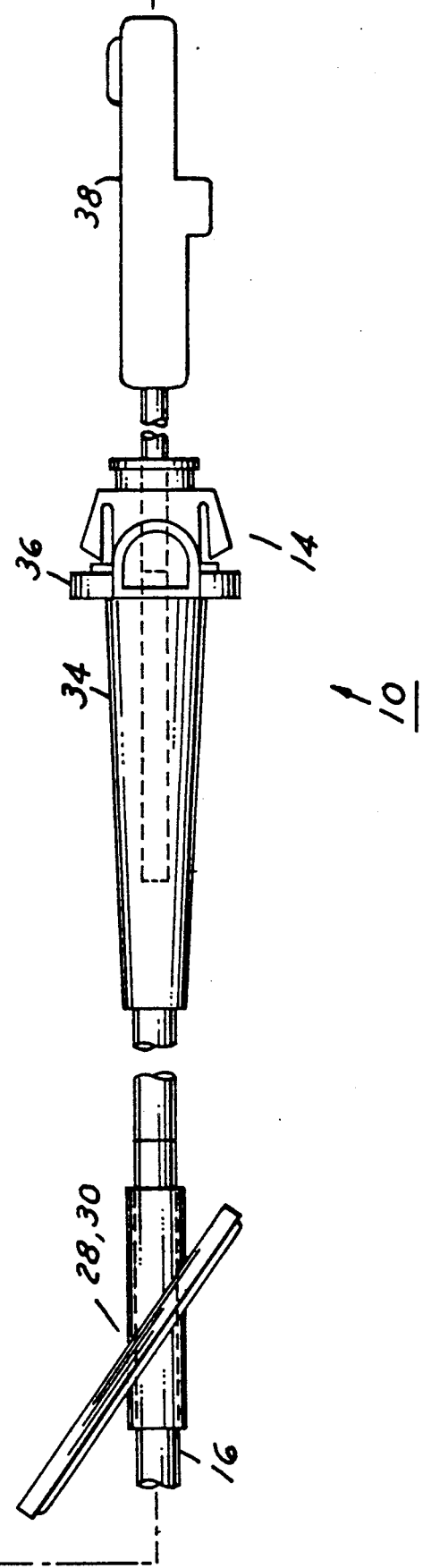

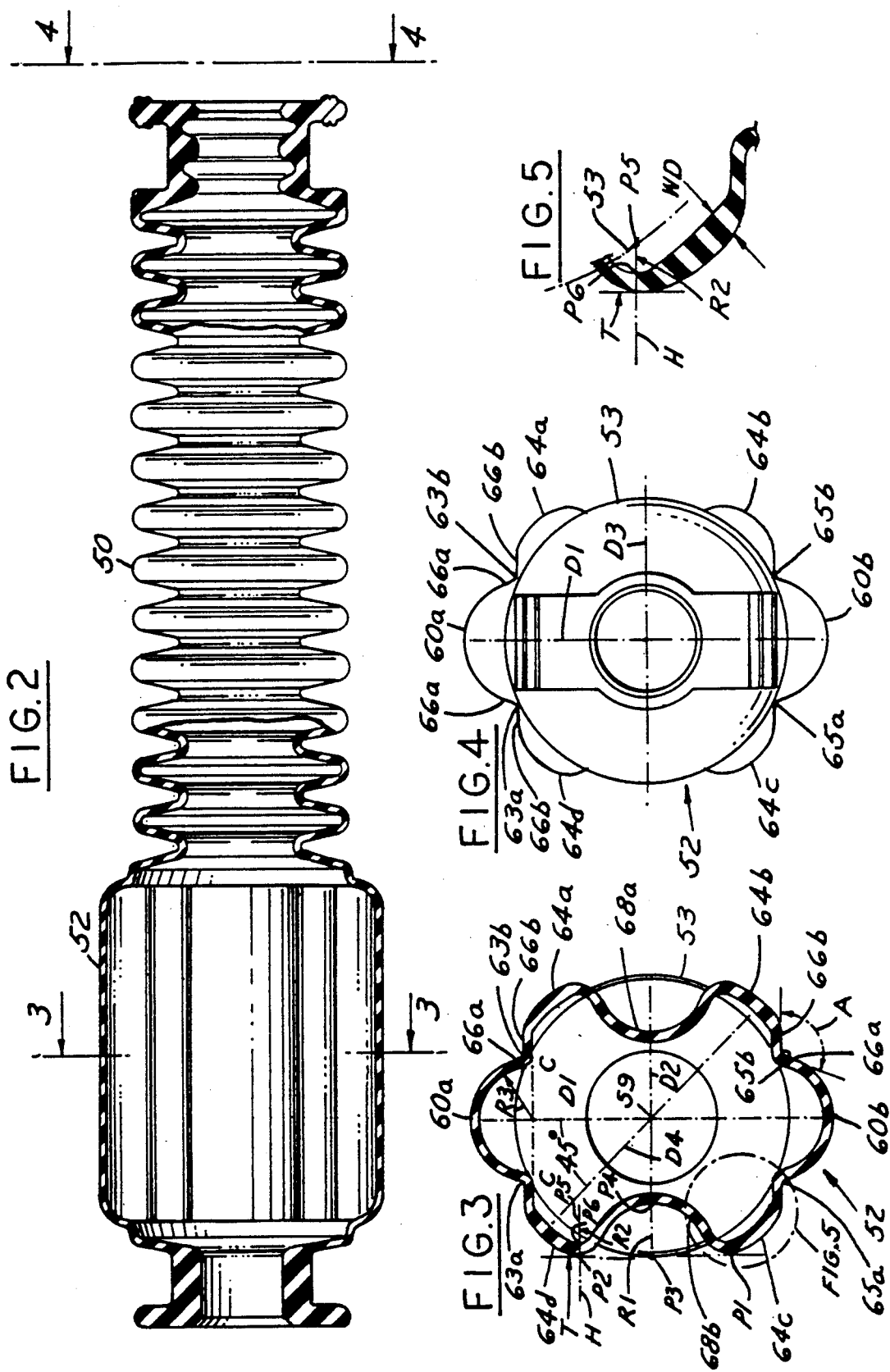

SEALED PROTECTIVE BOOT FOR MOVABLE SHAFTS

FIELD OF THE INVENTION

This invention relates to sealed protective boots for reciprocating shafts.

BACKGROUND AND SUMMARY OF THE INVENTION

Protective boots are used to essentially isolate members, including reciprocating members such as shafts, from dirt, dust and other contaminants. To be effective, the boot must be sealed. However, if it is sealed, the internal volume of the boot will change as the shaft is reciprocated causing a force on the shaft which may adversely affect the operation, as where the shaft is a part of a cable control system. It has been common to vent the bellows or boot so that excess pressure is vented to the atmosphere. In such a construction, upon contraction of the volume, contaminants may be drawn into the boot or bellows through the vent. It is thus desirable for the protective boot to provide an essentially constant volume and constant pressure chamber around the shaft to prevent the inspiration of atmospheric contaminants into the area around the shaft.

U.S. Pat. No. 4,058,018 describes an internal pressure compensating flexible bellows having first and second longitudinal sections, joined together end to end, and adapted to envelop the connection between reciprocating elements which are moved toward and away from one another. The first section has a plurality of circumferential convolutions, or "accordion-like" folds. The second section has a series of flutes which extend longitudinally. As the convoluted section contracts the fluted section expands radially outward, that is, the entire wall of the second section expands radially or stretches, in a manner similar to a balloon being inflated. Such a construction will cause a progressive increase in pressure which may adversely affect the system by creating an excessive force resisting contraction. In addition, this radial stretching may possibly lead to premature failure of the bellows because of the repeated cycles of stretching and contraction. As described, such a construction is adapted to function from an unstretched, neutral condition to a stretched condition. As a result, the neutral position must correspond to the condition of minimum axial extension of the system.

U.S. Pat. No. 4,407,517 generally describes a protective boot for use with a solenoid. The boot moves between two ends, one sealed to a stationary housing and the other sealed to the end of a movable shaft. The boot defines a generally constant volume chamber which changes its shape longitudinally or in the same direction as the movement of the shaft. The boot itself is displaced in the longitudinal direction and it folds over the end of the shaft a its shape is changed to maintain a constant volume. This folding over of the boot may interfere with needed clearance at the end of the shaft.

It is desirable to provide a protective boot which will accommodate changes in pressure in either direction from a neutral position. It is also desirable to have a protective boot which does not change its shape longitudinally so as to fold over the end of the shaft. It is also desirable to have a protective boot which does not stretch, resulting in fatigue and possible failure.

Among the objectives of the invention are to provide a boot which functions by flexing rather than stretching; which is operable between a neutral position to a position of maximum extension in one direction and between a neutral position and a position of minimum extension in the other direction.

In accordance with the invention, the protective boot has at least one section comprising some portions which flex outwardly or pop out from a neutral position in response to a predetermined increase in pressure in the section, and other portions flex inwardly or pop in, in response to a predetermined decrease in pressure from a neutral position.

Preferably, the portions are constructed and arranged to flex outward at a predetermined pressure which is higher than the neutral or atmospheric pressure. The outward flexing or popping out of the portions occurs at the predetermined pressure and increases the volume such as to relieve the pressure. The predetermined pressure is adequate to initiate the flexing but yet is not so high as to adversely affect the reciprocation of the movable shafts.

Correspondingly, when a pressure decrease from neutral occurs, a relatively low predetermined pressure is reached which is sufficient to initiate the inward flexing from a neutral position of certain portions of the section. The relatively low pressure is not so low as to cause an inspiration of atmospheric contaminants into the boot.

The flexing action may be thought of as being similar to the flexing of containers such as thin walled oil cans. For example, the pressure in the can decreases as the fluid therein is dispensed, at a given low pressure, the walls of the can are flexed inward, thereby defining a smaller volume. Just as in the case of an oil can, the flexible portions of the invention do not respond proportionally to a pressure change, rather, the flexing action is triggered at predetermined, desired pressure. Therefore, the contour of the boot changes at predetermined pressures. The boot defines a chamber, which comprises two sections, one section of the boot comprises the flexing portion.

The protective boot comprises basically two sections, a longitudinally extendible and contractible first section and a radially extendible and contractible second section. The first section has one end adapted to be sealed to a reciprocating shaft and the other end is connected to an integral collar which provides communication between the first section and the second section. The first section has a plurality of circumferential pleats which extend circumferentially and which are spaced apart. When the shaft is extended the pleats of the first section are expanded from a neutral position. When the shaft is moved in the opposite direction from a neutral position, the pleats of the first section are spaced closer together.

The second section comprises a plurality of circumferentially spaced portions extending axially from the center of the second section, some of said portions being concave outwardly from the center and some of said portions extending axially and being concave inwardly in the neutral position connected by relatively thicker outwardly curved portions.

In the preferred embodiment there are basically three portions, relatively thicker outwardly curved portions, relatively thinner outwardly concave portions and relatively thinner inwardly concave portions. Preferably, there are four relatively thicker outwardly curved portions, and each is arranged adjacent and between a relatively thinner inwardly concave portion and a relatively thinner outwardly concave portion. Preferably, the relatively thicker outwardly curved portions are arranged in pairs, each pair being diametrically opposed at opposite ends of an axis. Preferably, there are two relatively thinner outwardly concave portions which are also diametrically opposed and there are two relatively thinner inwardly concave portions also diametrically opposed. Thus, in the preferred embodiment, there are eight portions arranged around the circumference of the second section as follows, beginning with a relatively thin outwardly concave portions: thin outwardly concave portion, thick outwardly curved portion, thin inwardly concave portion, thick outwardly curved portion, thin outwardly concave portion, thick outwardly curved portion, thin inwardly concave portion and thick outwardly curved portion. The relatively thicker outwardly curved portions are relatively rigid. The relatively thinner inwardly concave portions and the relatively thinner outwardly concave portions, are able to flex.

As the shaft is extended from a neutral position, the outwardly concave portions flex inwardly. As the shaft is retracted from a neutral position, the inwardly concave portions flex radially outwardly.

The second section is adapted to be sealed to a housing which encompasses the shaft. The second section is also connected, at its other end, to the integral collar which provides communication between the first section and the second section so that an exchange of gaseous fluid can take place between the two sections. The second section is constructed and arranged to be fixed in the longitudinal direction and it does not move longitudinally with the shaft as the shaft extends and retracts.

BRIEF DESCRIPTION OF THE DRAWINGS

FIG. 1 is a part sectional fragmentary, front elevational view of a cable system which includes a shaft enclosed in a protective boot.

FIG. 2 is an enlarged front view of the protective boot, partially in section, and showing details of the wall of the protective covering.

FIG. 3 is a sectional view generally taken along line 3—3 in FIG. 2.

FIG. 4 is an end view taken along the line 4—4 in FIG. 2.

FIG. 5 is an enlarged sectional view taken at the encircled portion in FIG. 3.

DETAILED DESCRIPTION OF THE INVENTION

Figure 6:
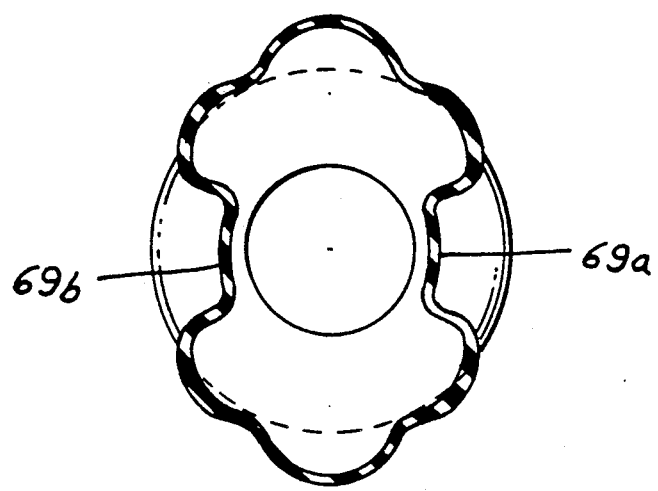
FIG. 6 is a sectional view similar to FIG. 3 showing the contour of the second section during retraction of the shaft.

Referring to FIG. 1 transmission cable system 10 is shown which embodies the invention. The system 10 has a transmission end 12 and a shift end 14, connected by a cable 16. The transmission end 12 consists of a molded rod end 11 which is connected to shaft 13 at end connector 18. Shaft 13 is enclosed within a protective boot 20 which is connected at one end to connector 18 and at the other end to an end connector 22 on a bracket 24 adapted to be fixedly mounted as on a housing of a automotive transmission. Shaft 13 is connected to cable 16 within an extension 26 on bracket 24. Cable 16 runs through a fire wall (not shown) at fire wall grommet 28 and grommet retainer 30, and then through the shift end 14 which basically consists of conduit abutment 34, housing 36 and movable adjuster body 38, which moves as shown in FIG. 1. Cable 16 is extended and retracted when movable adjuster body 38 moves as shown in FIG. 1.

Protective boot 20 is constructed to prevent the inspiration of atmospheric contaminants 40 into a sealed chamber comprised of two integral section parts 42a and 42b. The protective boot 20 extends generally longitudinally along shaft 13. The protective boot 20 has a sealed end 44 adjacent end connector 18 and another sealed end 46 adjacent end connector 22.

The protective boot 20 is made of elastomeric material and molded in one piece as by injection molding or blow molding. The boot 20 comprises two integral sections. The first section 50 is longitudinally extendable and contractible. The second section 52 is radially extendable and contractible. The first section 50 is sealed at sealed end 44, and has a plurality of convoluted circumferential pleats 54 which may be spaced apart from a neutral position to achieve extension of section 50. The pleats 54 may be spaced closer together from a neutral position to achieve contraction of section 50.

The second section 52 is sealed to bracket 24 at sealed end 46. The second section 52 is fixed in the longitudinal direction and has a plurality of circumferentially spaced axially extending portions 58 distributed around its circumference 56.

As shown in FIG. 3, two of the portions 58 are outwardly concave portions 60a, 60b, opposed 180° apart on the circumference 56 of the second section 52, and shown in the neutral position.

Outwardly concave portions 60a, 60b are constructed and arranged to assume an outwardly concave contour 60a, 60b as shown in FIGS. 3 and 4, in the neutral position, thereby defining a maximum diameter, D1 of the second section 52. For illustration purposes, diameter, D1 will be designated along a vertical axis. When the shaft 13 is extended from neutral, the pressure in section 52 begins to decrease and at a predetermined low pressure, outwardly concave portions 60a, 60b flex inwardly toward the center 59 of second section 52, an become generally flat with a slightly curved inward contour 62a, 62b, as shown in FIG. 7.

An integral collar 53 between the first section 50 and the second section 52 permits an exchange of gaseous fluid 43 within the sealed chamber, which has two integral sections 42a, 42b.

Figure 7:
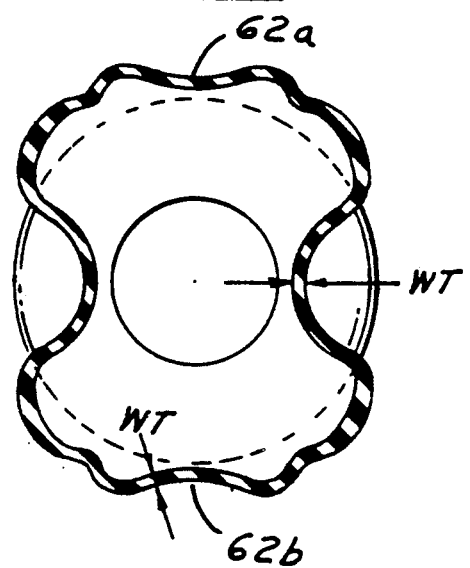
FIG. 7 is a sectional view similar to FIG. 3, showing the contour of the second section during extension of the shaft.

When the shaft 13 is extended from a neutral position, the outwardly concave portions 60a, 60b flex radially inwardly, as shown in FIG. 7, and reduce the effective volume 42a within second section 52, at the same time the effective volume 42b within the first section 50 increases as circumferential pleats are spaced apart from a neutral position.

Pairs of elbows 63a, 63b and 65a, 65b are adjacent each respective outwardly concave portions 60a, 60b on the circumference 56 of the second section 52. The elbows 63a, 63b, 65a and 65b have one leg 66a which extends essentially vertically to connect to the outwardly concave portions 60a, 60b. The second leg 66b of each elbow extends essentially horizontally to connect to relatively thicker outwardly curved portions 64a, 64b, 64c, 64d. The relatively thicker outwardly curved portions 64a, 64b, 64c, 64d curve outward from the center 59 of the second section 52 and are adjacent to the outwardly concave portions 60a, 60b, on the circumference 56. The outwardly curved portions 64a, 64b, 64c, 64d are also connected to two opposed inwardly concave portions 68a, 68b, which in the neutral position, as shown in FIG. 3, curve inward toward the center 59 of the second section 52. The inwardly concave portions 68a, 68b are connected adjacent and between the relatively thicker outwardly curved portions 64a, 64b, 64c, 64d on the circumference 56 of the second section 52. Each respective inwardly concave portions 68a, 68b is disposed approximately 90° on the circumference 56 of the second section 52, respectively, from each outwardly concave portions 60a, 60b. The inwardly concave portions 68a, 68b define a relative minimum horizontal diameter, D2 of the second section 52, as shown in FIG. 3. When the shaft 13 is retracted from a neutral position, the pressure in section 52 begins to increase and at a predetermined high pressure, the inwardly concave portions, 68a, 68b, flex radially outwardly as shown in FIG. 6, to a generally flat contour 69a, 69b. When shaft 13 is retracted from a neutral position, the portions 69a, 69b, as shown in FIG. 6, increase the effective volume 42a within section section 52 and at the same time the effective volume 42b of first section 50 decreases.

The configuration of each portion 58 on the circumference 56 of the second section 52 can best be understood by reference to a radius R which defines the curvature or an arc of portions 58, in the neutral position, as shown in FIGS. 3 and 4.

The radius R of the arc of the various portions can be best understood by reference to a tangent T, as shown in FIGS. 3 and 4. Tangent T meets a pair of points P1, P2 at the horizontal most exterior surface of a pair of relatively thicker outwardly curved portions 64c, 64d as shown in FIGS. 3 and 4. The arc of the inwardly concave portions 68a, 68b is at a radius, R1, from a point P3 at which a projection of the circumference of the collar 53 intersects the tangent T, to the point P4 on the exterior surface of the inwardly concave portion 68b. The collar 53 has a diameter, D3. Preferably, R1 is along D3.

Preferably, D3 is approximately equal to the sum of two times R1 plus D2, and P3 is midway between P1 and P2.

The relatively thicker outwardly curved portions 64a, 64b, 64c, 64d have an interior arc defined by R2 at a point adjacent to the inwardly concave sections 68a, 68b. Radius, R2, extends from the point P5 at which the projection of the collar 53 intersects a horizontal line H perpendicular to the tangent T, to the point P6 on the interior surface of the relatively thicker outwardly curved portions, as shown in FIGS. 3 and 5.

As shown in FIG. 3 in the neutral position, the outwardly concave portions 60a, 60b have an arc which may be defined by a radius R3 from the center of a chord CC which intersects the horizontal legs 66b of the elbows 63a, 63b.

Preferably, the diameter D4 which is the maximum diameter defined by the two pairs of the relatively thicker outwardly curved portions, 64a, 64c and 64b, 64d, taken at 45° from diameter D1, is less than D1 and greater than D2 and D3. Preferably, radii R1 and R3 are about the same and R2 is less either one of R1 and R3. Preferably, D1 is about six times the length of R1, and D1 is about three times the length of D2. Preferably, D3 and D4 are each about twice the length of D2. Preferably, R1 and R3 are about the same and are each about 3.5 times the length of R2.

As shown in FIGS. 3, 5, and 7, the maximum wall thickness, WD, of the relatively thicker outwardly curved portions 64a, 64b, 64c, 64d is greater than the maximum wall thickness, WT, of the outwardly concave portions 60a, 60b, and 62a, 62b, and the inwardly concave portions 68a, 68b and 69a, 69b. Preferably, WD is 1.7 times the thickness of WT. Preferably the included angle A of the elbows 63a, 63b, 65a, 65b in the neutral position, is at least 90 degrees. Desirably, the boot 20 is of an elastomeric material and preferably it is a polyester material having high strength and low permeability.

The above mentioned arcs defined by R1, R2 and R3, the angle A of each respective elbow 63a, 63b, 65a, 65b, the diameters D1, D2, D3 and D4 and the wall thicknesses WD, WT combine to respond to a predetermined low pressure and a predetermined high pressure and to produce an unique set of forces which flexes outwardly concave portions 60a, 60b inwardly as the shaft is extended from a neutral position, as shown in FIG. 7, and which flexes the inwardly concave portions 68a, 68b outwardly when the shaft is retracted from a neutral position, as shown in FIG. 6.

It should be appreciated that the device as disclosed may be configured in a variety of similar configurations to achieve the inward and outward flexing of the portions of the second section to define a constant volume in cooperation with the first section. It should be understood that many modifications and variations are possible in light of the above teaching and the present invention may be practiced otherwise than as specifically described.

I claim:

1. A protective boot constructed and arranged for providing a sealed chamber around a reciprocating shaft, which extends from a neutral position and retracts from a neutral position, comprising:
   a body of material that is capable of flexing,
   said body comprising a longitudinally extendible and contractible first section, adapted to have one end sealed to a reciprocating shaft, said first section comprising a plurality of circumferential pleats constructed and arranged to be spaced apart from a neutral position to achieve longitudinal extension with said shaft and then to be spaced closer together from a neutral position during retraction of said shaft;
   said body comprising an integral second section adapted to be sealed to a housing which encompasses said shaft,
   said second section being constructed and arranged to be fixed in the longitudinal direction;
   said second section comprising a plurality of circumferentially spaced portions extending axially from the center of said second section on its, circumference, and some of said portions being outwardly concave with respect to the longitudinal axis and some of said portions extending axially and being with respect to the longitudinal axis inwardly concave in the neutral position, connected by relatively thicker outwardly curved portions; and
   said inwardly concave portions constructed and arranged to flex radially outward from a neutral position at a predetermined high pressure and said outwardly concave portions constructed and arranged to flex inwardly from a neutral position at a predetermined low pressure.

2. The protective boot set forth in claim 1 wherein said outwardly concave portions are diametrically apposed and said inwardly concave portions are diametrically apposed.

3. The protective boot as set forth in claim 2 and including said outwardly concave portions constructed and arranged in the neutral position to define a maximum vertical diameter, D1, through said center of said second section and to assume a generally flat and slightly convex contour, with respect to the longitudinal axis, when flexed inwardly toward said center at a predetermined low pressure when said shaft is extended from a neutral position.

4. The protective boot as set forth in claim 3 including a pair of elbows adjacent each respective side of said outwardly concave portions on said circumference of said second section, each of said elbows having one leg which extends essentially vertically and is connected to said outwardly concave portions and the other leg which extends essentially horizontally;

said relatively thicker outwardly curved portions, which curve outward from said center, adjacent each respective side of said outwardly concave portions on said circumference and connected to said horizontal leg of said elbow; and two inwardly concave portions, which curve inward toward said center, connected adjacent and between said relatively thicker outwardly curved portions on said circumference, where each of said inwardly concave portions is disposed approximately 90° on said circumference, respectively from each of said outwardly concave portions, said inwardly concave portions defining a minimum horizontal diameter, D2, relative to said maximum vertical diameter of said second section in the neutral position; and flexing radially outward from said neutral position at a predetermined high pressure when said shaft is retracted from said neutral position; and an integral collar between said first section and said second section constructed and arranged to permit an exchange of gaseous fluid between said sections, and having a diameter, D3.

5. The apparatus of claim 4 in which the arc of each of said inwardly concave portions has a radius R1, from an exterior point at which a projection of said collar intersects a tangent to the outermost point on the exterior surfaces of a pair of said relatively thicker outwardly curved portions, to a point on the exterior surface of said inwardly concave portions.

6. The apparatus of claim 5 wherein the interior arc of each of said relatively thicker outwardly curved portions adjacent said inwardly concave portions has an interior radius, R2, from the point at which said projection intersects a line perpendicular to said tangent, to a point on the interior surface of said relatively thicker outwardly curved portions.

7. The apparatus of claim 6 in which the arc of each of said outwardly concave portions, in the neutral position is at a radius, R3, from the center point of a chord which intersects said horizontal legs of said elbows to a point on the interior surface of said outwardly concave portions.

8. The apparatus of claim 4 in which a maximum diameter, D4, defined by said relatively thicker outwardly curved portions is less than D1 and greater than D2 and D3.

9. The apparatus of claim 7 in which the radii, R1 and R3, are about the same length and radius R2 is less than R1 and R3.

10. The apparatus of claim 5 in which D1 is about six times the length of R1.

11. The apparatus of claim 8 in which D1 is about three times the length of D2, and D3 and D4 are each about twice the length of D2.

12. The apparatus of claim 9 in which R1 and R3 are each about 3.5 times the length of R2.

13. The apparatus of claim 12 in which the maximum wall thickness of said outwardly curved portions is at least 1.7 times the maximum wall thickness of each of said inwardly concave portions and said outwardly concave portions.

14. The apparatus of claim 10 in which the maximum wall thickness of said inwardly concave portions, said outwardly concave portions and said elbows are about the same.

15. The apparatus of claim 14 in which the included angle of each of said elbows is at least 90 degrees.

16. The apparatus of claim 15 in which D4 and R2 remain essentially constant during said reciprocating of said shaft.

17. The protective boot of claim 1 in which said boot is an elastomeric material.

18. The protective boot of claim 1 in which said boot is of polyester.

* * * * *